United States Patent [19]

Simpson

[11] 4,118,685

[45] Oct. 3, 1978

[54] HOLOGRAPHIC SIGNATURE PROCESSOR

[75] Inventor: Homer L. Simpson, Dahlgren, Va.

[73] Assignee: The United States of America as represented by the Secretary of the Navy, Washington, D.C.

[21] Appl. No.: 718,250

[22] Filed: Aug. 26, 1976

[51] Int. Cl.² .............................................. G06K 9/00
[52] U.S. Cl. ............................ 340/146.3 P; 250/550; 350/3.83; 350/162 SF
[58] Field of Search ........ 350/DIG. 1, 161 R, 161 W, 350/162 SF, 3.5, 3.75, 3.78, 3.83; 340/173 LM, 146.3 P; 250/550

[56] References Cited

U.S. PATENT DOCUMENTS

| | | | |
|---|---|---|---|
| 3,427,586 | 2/1969 | Lohmann | 340/146.3 P |
| 3,483,386 | 12/1969 | Jernigan | 350/161 W |
| 3,486,016 | 12/1969 | Faiss | 250/550 |
| 3,668,405 | 6/1972 | Brooks et al. | 250/550 |
| 3,674,331 | 7/1972 | Caulfield | 350/DIG. 1 |
| 3,680,943 | 8/1972 | Ogden et al. | 350/3.83 |
| 3,692,380 | 9/1972 | Inagaki | 350/3.78 |
| 3,694,657 | 9/1972 | Brooks | 350/3.83 |
| 3,822,379 | 7/1974 | Brienza | 350/161 W |
| 3,877,776 | 4/1975 | Okino et al. | 350/3.83 |
| 3,984,802 | 10/1976 | Lippel, Jr. et al. | 340/146.3 P |
| 3,989,347 | 11/1976 | Eschler | 350/3.75 |

Primary Examiner—Leo H. Boudreau

[57] ABSTRACT

A signature is holographically recorded for correlation and parallel processing against a large library of signatures. A transient electrical signal produces a pressure wave in an optical wavefront modulator where it is frozen in position by a picosecond laser. The modulated wavefront is made to interfere at a hologram plane with a reference wavefront which is converging to a focal point behind the hologram plane. Because the holograms are of the Fresnel type, the hologram plane may be partitioned off and a library of signatures may be recorded on the same hologram plane and addressed simultaneously. After processing, the reference wave is removed and the optical wavefront modulator illuminated by a continuous wave coherent source. If a signature, recorded on the hologram, is placed in the optical wavefront modulator, then the reference wave for that hologram is reconstructed and detected to identify that signature.

7 Claims, 7 Drawing Figures

HOLOGRAPHIC SIGNATURE PROCESSOR

BACKGROUND OF THE INVENTION

The present invention relates to the art of optical information storage and real-time parallel processing of signatures for identification.

In general, a signature may be anything that is detectable about an object which can be used to identify it as a unique object unto itself and/or to establish that it belongs to a class of objects. Radar signals, sonar signals, visual pictures, the objects themselves, may be used as signatures of a target. Systems under development digitize a return radar signal and use a computer with relatively sophisticated algorithms to match an unknown signature against a collection of known signatures or signature features. However, positive target identification is a problem and storage of a large number of signatures requires increasingly more space.

SUMMARY

The Holographic Signature Processor provides high density storage and real-time parallel processing of signatures or signature data. The invention utilizes the Fresnel (rear field) wavefront of a diffusely illuminated object (signature) to allow the hologram plane to be divided into many holograms for the purpose of high density storage and parallel processing. A signature is illuminated with a coherent optical wavefront. The signature wavefront is caused to diffusely illuminate the hologram plane where it interferes with a reference wavefront which is converging to a focal point behind the hologram plane. Each point of the signature presented for recording must illuminate the entire hologram plane where the interference pattern is recorded on a photosensitive medium. A library of signatures can be stored on a single hologram plane. The size of the library will be a function of the area of the hologram plane and the area of the individual signature holograms.

The photosensitive medium is then processed in place or processed and returned to its original position with respect to the signature wavefront. The reference wave is removed and the system is ready to process signatures or signature data. The signature aperture is illuminated continuously by a continuous wave (CW) coherent source and when a signature which has been recorded appears within the aperture, its original reference wave is reconstructed. The reconstructed reference wave may be detected with a photodetector identifying the signature as a particular recorded signature stored in the library.

STATEMENT OF THE OBJECTS OF THE INVENTION

An object of the invention is to utilize holographic information storage techniques to parallel process signature data.

Another object of the invention is to holographically record a transient electrical signature.

An object of the invention is to provide high density storage and real-time processing of signature data.

Other objects, advantages and novel features of the invention will become apparent from the following detailed description of the invention when considered in conjunction with the accompanying drawings.

DETAILED DESCRIPTION OF THE INVENTION

The Holographic Signature Processor stores a signature and then later identifies this signature in the presence of other signatures.

Figure 1:
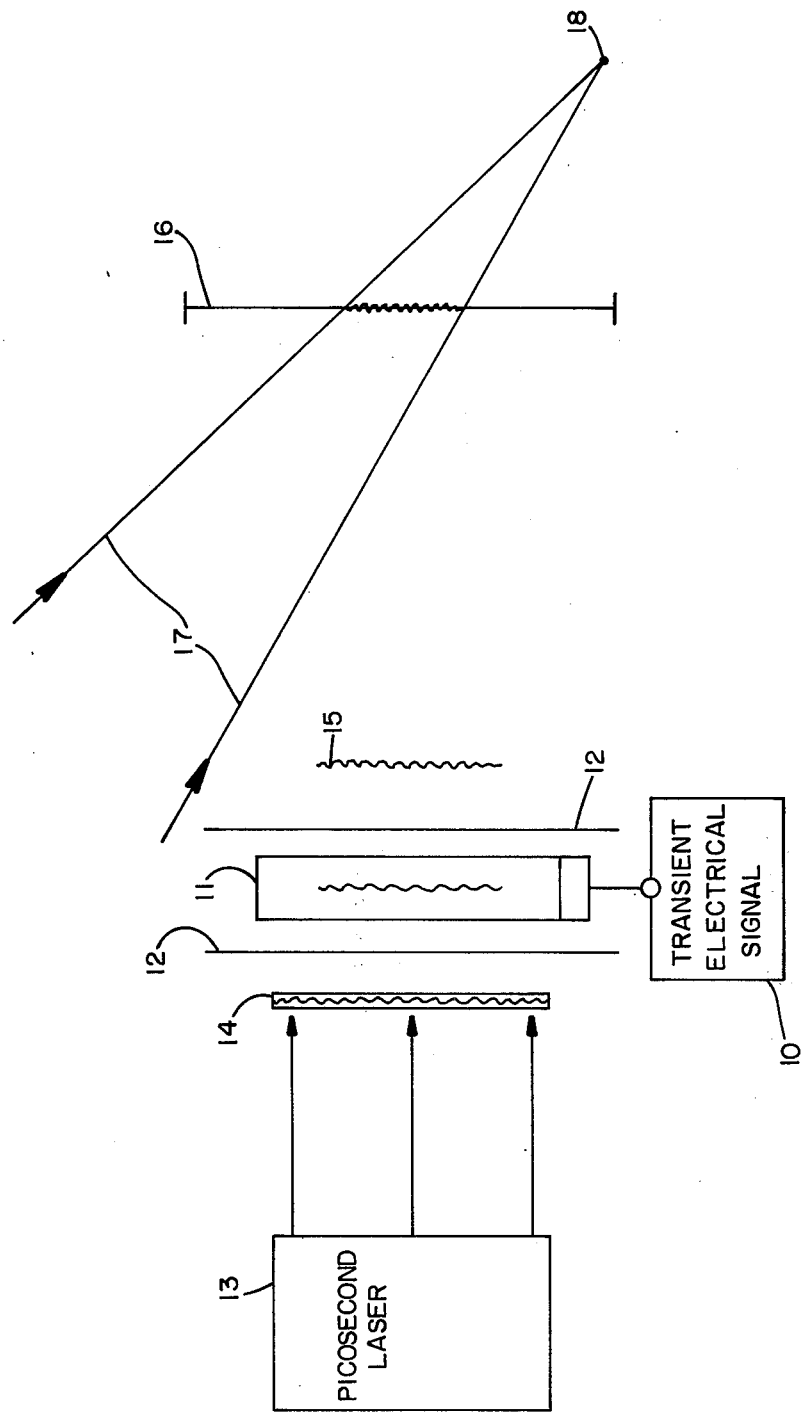
FIG. 1 is a schematic diagram of holographic signature storage.

FIG. 1 illustrates the storage of a signature. A transient electrical signal such as a radar signature is used as an example and should not be construed to limit the invention. Other types of signatures can be holographically recorded using conventional techniques.

A radar signal 10 is a transient electrical signal and must be frozen in position during the recording process, as a very small displacement of an object during the recording process would destroy the record. The electrical signal 10 is transformed from the electrical to the optical domain by using the electrical signal to produce a pressure wave in an optical wavefront modulator 11 such as an ultrasonic light modulator (ULM) or an acousto-optical cell. FIG. 1 shows an ULM 11 placed between crossed polarizers 12 which provide amplitude modulation across the wavefront as a function of the amplitude of the electrical signal 10. The modulator 11 is shown in the Raman-Nath mode and the electrical signal 10, which is propagating in the ULM 11 is frozen in position by a laser light pulse 13 whose duration is of the order of picoseconds. Diffuser 14 provides for diffuse illumination of the ULM 11. The modulated wavefront 15 is made to interfere at the photosensitive media hologram plane 16 with a reference wavefront 17 which is converging to a focal point 18 behind the hologram plane 16. The hologram 16 formed using this geometry is a Fresnel hologram.

Figure 2:
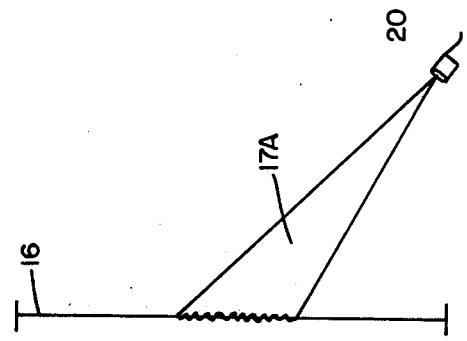
FIG. 2 is a schematic diagram of a holographic reconstructing filter.
Figure 2:
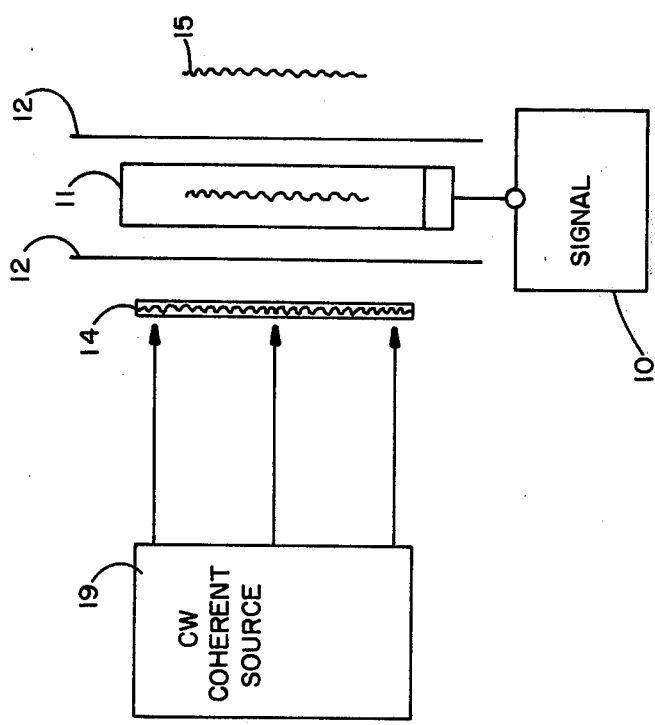

After processing the hologram, the reference wave 17 is removed, and the ULM 11 is illuminated by a continuous wave coherent source 19. See FIG. 2. When the transient electrical signal 10 is put into the ULM 11 and the recorded modulated optical wavefront 15 is reproduced, the reconstructed reference wave 17A may be detected with a photo detector 20 identifying the radar signature as the recorded electrical signature.

Figure 3:
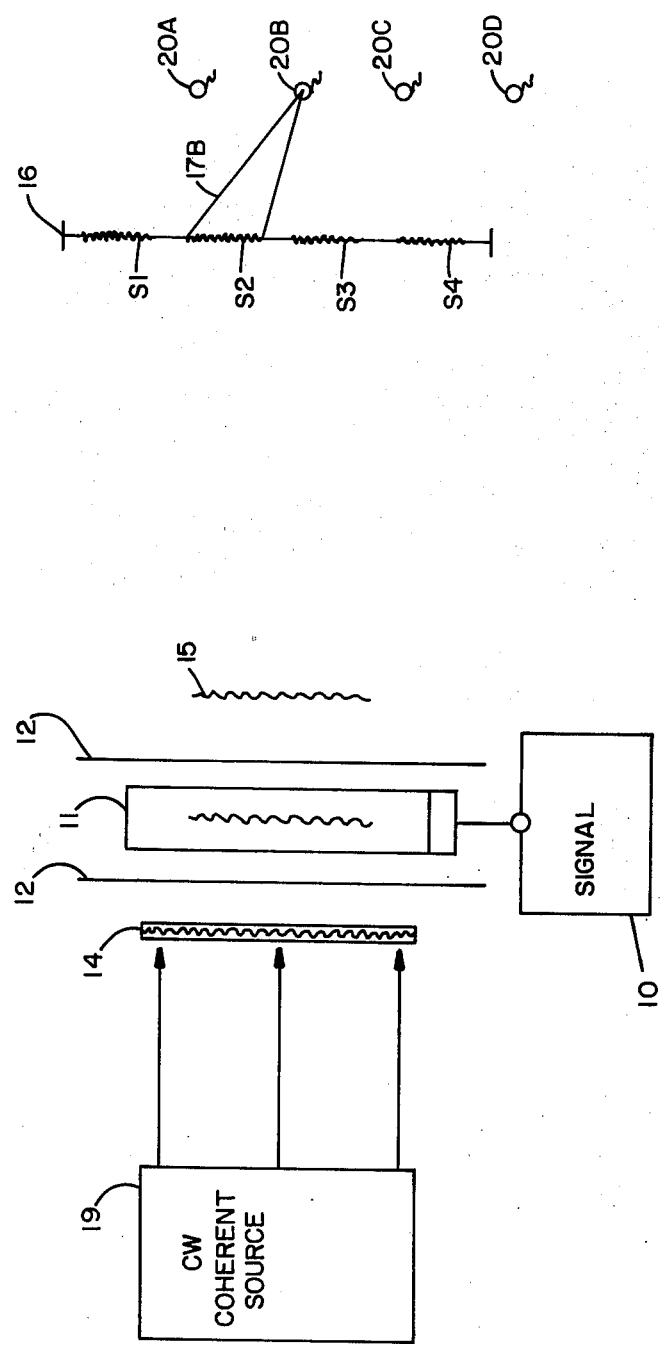
FIG. 3 is a schematic diagram of signature identification from library (parallel processing).

Because the holograms are of the Fresnel type, a library of signatures may be recorded on the same hologram plane and addressed simultaneously. In FIG. 3, signatures S1, S2, S3 and S4 are recorded on the hologram plane 16. If signature S2 is placed in the ULM 11, then the reference wave 17B for hologram S2 is reconstructed and detected by photodetector 20B to identify signature S2. None of the other holograms S1, S3 or S4 will be caused to reconstruct their respective reference waves.

The pulse duration required of the picosecond laser system (PLS) 13 is determined by the wavelength of the acoustical wave and its velocity of propagation. When holograms are made of diffusely reflecting objects, a high quality reconstruction is obtained provided the object moves less than one-tenth of the wavelength of the illuminating source ($\lambda/10$). This is the first exposure criterion requirement and is given by $$\Delta t = \lambda/10V_s \qquad (1)$$

where $\Delta t$ is the exposure time, $\lambda$ is the light wavelength and $V_s$ is the propagation velocity of the acoustical wave.

The second exposure criterion is based upon resolvable scene detail upon reconstruction. In the case of an acoustical wave, it is postulated that the waveform will be faithfully recorded provided that it moves less than one-tenth of the wavelength of the acoustical wave ($\lambda/10$) during the exposure time. This allows an exposure time $$\Delta t = 1/10f \qquad (2)$$

where $f$ is the fundamental frequency of the acoustical wave. This requirement has been further relaxed to movement of less than $\lambda$ (acoustical wavelength) by researchers holographically recording electric signals with reasonably good success.

As an example, a HRR (high resolution radar) signal return must be recorded with a bandwidth of from 200 MHz to 1 GHz, the more the better. This will require an ULM operating in the range of 350 MHz to 2 GHz. Media which will support these frequencies properly for the application will have a $V_s$ between 6 and 11 Km/sec. If the ULM material is LiNbO$_3$, where $V_s = 6.6$ Km/sec, then $\Delta t = 7.6$ ps, from Equation (1). If the second criterion is used, then from Equation (2), $f = 350$ MHz gives $\Delta t = 3.2$ ns and $f = 2$ GHz gives $\Delta t = 50$ ps. This means that the PLS 13 must provide the ULM 11 with a pulse duration in the range of 5 to 300 ps.

The energy per pulse required of the PLS 13 will be a function of the photosensitive medium used for recording and the geometry necessary to stay within the coherence length of the PLS.

For holographic purposes, the coherence length is $$\Delta L = c \sqrt{2(\ln 2)/\pi \Delta \nu} \qquad (3)$$

where $c$ is the speed of light and $\Delta \nu$ is the linewidth (bandwidth), which was derived by Siebert for a chirped gaussian pulse by using the criterion that the complex degree of temporal coherence equals $1/\sqrt{2}$, which is related to the recorded interference fringe contrast ratios.

A 50 ps pulse would exist in space over a distance of 1.5 cm; however, its linewidth, $\Delta \nu = 2 \times 10^{10}$Hz, would only allow for a coherence length, $\Delta L$ of 4.68 mm as calculated by substitution in Equation (3), as the best case is normally considered to be the transform limit $$\Delta \nu \Delta t \simeq 1. \qquad (4)$$

The holograms are recorded on a hologram plane 30, for example, of 5 inches square and diffusely illuminated by a signature contained within a 1 inch square aperture 32. See FIG. 4. The maximum path differences must be less than the coherence length of the source. This can only be accomplished by placing the hologram plane 30 at the appropriate distances away from the signature aperture 32. The further the distance, the more energy required of the laser 13 for a given recording medium. The lens 33 provides magnification and images the signature on the diffuser plane 34.

Typical recording media require exposures from 2 $\mu$j/cm$^2$ to 1 mj/cm$^2$ (j $\equiv$ joule). Given $\Delta L = 4.68$ mm, then $l > 34$ cm ($l \equiv$ the distance from the signature aperture 32 to the hologram plane 30) and the PLS's energy per pulse must fall between 2.41 mj and 1.2 j. If the original source was at 1.06 $\mu$m, it would be necessary to frequency double into the optical region at 0.53 $\mu$m, It is reasonable to expect the linewidth to be doubled and thus the coherence length reduced by a factor of two. Given this condition, $l > 69$ cm and the energy per pulse would fall between 9.5 mj and 4.8 j.

Possible sources of picosecond laser pulses are, for example, Nd: YAG laser and a mode-locked Ruby laser. A transform limited Nd: YAG laser which will deliver in excess of 18 mj in 50 ps at 0.53 $\mu$m is available commercially from Quantel International. A mode-locked ruby laser has been demonstrated to generate 50 ps transform limited pulses with an energy per pulse of 50 mj. The ruby line, 6943 Å, would not require doubling.

There are two regimes in which ULM's are operated to allow the transformation of the signature 10 from the electrical to the optical domain with sufficient detail to make identification possible. The regimes are Raman-Nath and Bragg.

The Raman-Nath regime is a thin grating diffraction effect. The optical wavefront is modulated by phase shifts, introduced by changes in the path length of the optical wavefront propagating through the medium, due to the variation of the index of refraction caused by compression waves. It is a weak modulation and the medium is quite frequently placed between crossed polarizers 13 (FIG. 1) to generate an amplitude modulation across the aperture. Raman-Nath modulators operate at low frequencies, less than 100 MHz and typically less than 50 MHz with bandwidths between 10 and 20 MHz.

The Bragg regime is a volume grating diffraction effect. Light reflected from the acoustical wave planes will interfere in such a way as to be diffracted, to first order, into an angle $\theta$ which is a function of the wavelength of the optical source and the wavelength of the acoustical wave. There is only one Bragg angle, to first order, for a given acoustical frequency. If there is more than one frequency component in the signature and the optical and acoustical wavefronts are properly diverged, the frequency spectrum of the signature may be observed in the angular spread and amplitude of the Bragg diffracted light. If the ULM is placed in the front focal plane of a lens, the Fourier transform of the signature can be observed (optically) in the back focal plane.

Bragg modulators can be high frequency devices, greater than 100 MHz, and have been demonstrated at 1.56 GHz with a measured bandwidth of 550 MHz.

The ULM's and acousto-optical correlation schemes have a time-bandwidth product $$BT = \Delta f \Delta t \qquad (5)$$

which is a measure of resolution, where $\Delta f$ is the bandwidth, $\Delta t = D/V_s$ is the time required of the acoustical wave to cross the light beam, D is the optical beam diameter and $V_s$ is the velocity of the acoustical wave. For most correlation applications, the time-bandwidth product is limited by the aperture of the ULM which is the maximum optical beam diameter. That is, the signal fills the aperture.

A derivation of BT comes from the determination of the number of resolvable spots that may be obtained from an acoustical beam deflector (BT = number of resolvable spots). Using the analogy, BT can be used as a calculation of the number of resolved spots in the Fourier transform of a signature using an acousto-optical spectrum analyser.

Going back to the original derivation and realizing that the instantaneous value of the optical beam diameter is simply the pulse length for a pulse whose length is less than the aperture, it becomes apparent that $\Delta t$ is a constant for a given radar and target. Thus, the only way to increase the resolution is to increase the bandwidth of the processor, unless the processor departs from real-time and spreads the signature out in time for processing.

The optical cell media may use liquids that are good at about 20 MHz, isotropic solids up to about 150 MHz, and materials such as fused silica up to 500 MHz. Rutile, sapphire and yag are acceptable in the 1 to 2 GHz range.

Driving transducers of piezo-ceramic materials are limited to between 50 and 100 MHz due to grain size, materials such as crystal quartz and $LiNbO_3$ are limited to the range of 100 to 200 MHz due to bonding problems of the necessarily thin slices and evaporated transducers such as CdS and ZnO have been operated effectively up to 10 GHz. It is evident that sapphire driven by CdS or ZnO transducers will provide in excess of 500 MHz bandwidth.

If the signature input is preprocessed signature date, the performance required of the ULM 11 may be reduced or the ULM 11 may be replaced by a light valve to give better correlation. That is, the preprocessed data may be presented, using a light valve, as a two dimensional object, allowing more diversity of the image form and a corresponding decrease in potential library crosstalk.

Figure 4:
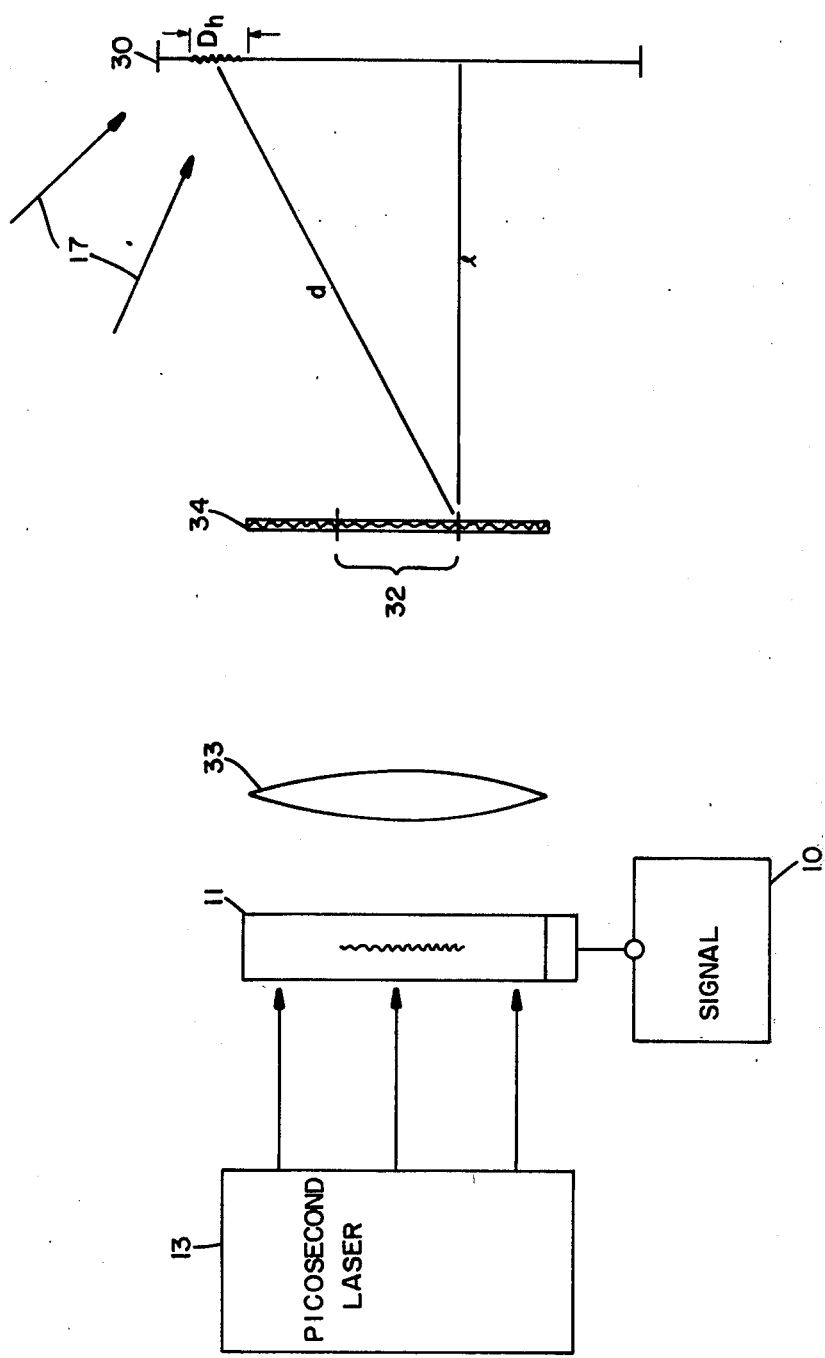
FIG. 4 is a schematic diagram of direct recording.

If the radar target signal 10 is to be recorded at a particular location in the hologram plane 30 by a single subnanosecond laser pulse, the basic components of the system are illustrated in FIG. 4. An instantaneous image of the signature is incident upon the diffuser 34, diffusely illuminating the hologram plane 30. In order to illustrate the amount of energy required per pulse, a mode-locked ruby laser 13 may be used in combination with a rutile ULM 11.

Using experimentally realized performance parameters, assume that $$f_o = 1.56 \text{ GHz}$$

and $$\Delta f = 550 \text{ MHz}$$

where $f_o$ is the acoustical carrier frequency and $\Delta f$ is the bandwidth. The exposure criterion given by Equation (2) requires that $$\Delta t < 1/10 f_o = 64.1 \text{ ps},$$

that is, the pulse length ($\Delta t$) of the PLS 13 must be less than 64.1 ps. The pulsed ruby is transform limited so that $$\Delta \nu_r = 1/\Delta t = 10 f_o = 15.6 \text{ GHz}$$

Substituting $\Delta \nu_r$ into Equation (3) gives a coherence length of $$\Delta L_r = 6 \text{ mm.}$$

This coherence length will allow the distance from the signature diffuser 34 to the hologram plane 30 to be reduced to $l = 26.1$ cm and thus reduce the required energy per pulse at 100% efficiency to $$E > 1.48 \text{ mj.}$$

Assuming that 25% of the power is used for the reference wave, then the energy required per pulse is $$E' = E/0.75 > 1.97 \text{ mj.}$$

An ULM 11 does not give 100% efficiency and the total energy required per pulse from the ULM 11 is given by $$E'' = E'/\eta$$

where $\eta$ is the efficiency given by $$\eta = (\pi^2 M/2\lambda_0^2)(l^2 I_a) \qquad (7)$$

where M is a figure of merit for the material, $\lambda_0$ is the optical wavelength, $l$ is the acoustical beam width and $I_a$ is the intensity of the acoustical wave in watts per meter squared (W/m$^2$). For the purposes of simplifying the calculations, assume that $$(l^2 I_a) \simeq 1 \qquad (8)$$

then $$\eta \simeq \pi^2 M/2\lambda_0^2. \qquad (9)$$

Ruby gives $\lambda_0 = 0.6943$ $\mu$m and M = 3.93 × 10$^{-15}$ for rutile. Substituting these values into Equation (9) gives $$\eta \simeq 4\% \ (Al_2O_3, 0.6943 \ \mu m)$$

and substituting the results into Equation (6) gives $$E'' = 49.3 \text{ mj.}$$

Another factor to be considered is the hologram limits on resolution. Given two points separated by a distance $a$ in the signature, they will be resolved in the reconstruction if $$\delta = 1.22 \lambda_r d/D_h \qquad (10)$$

where $\lambda_r$ is the reconstructing wavelength, $D_h$ is the diameter of the hologram aperture and $d$ is the distance from the aperture to the two points being resolved in the signature (see FIG. 4). This is the classical Rayleigh resolution criterion as applied to finite hologram apertures. The maximum value of $d$ is of the order of $$d = \sqrt{l^2 + (7.62 \text{ cm})^2} \qquad (11)$$

As mentioned previously, the value of $l$ is of the order of $l = 26.1$ cm which gives $$d = 27.2 \text{ cm}$$

It will be assumed that $\lambda_r = 0.5145$ μm, one of the higher energy lines of the Argon-Ion laser and $D_h = 4$ mm, in order to have 1008 holograms on a 5 inch square hologram plane. Substituting these values into Equation (10) gives $$\delta = 42.7 \text{ μm}.$$

Assume that the radar used has a pulse length of 1 ns and the target is of the order of 100 ft in length, then the signature duration will be $$T = 101 \text{ ns}.$$

The length of the signal in the cell is given by $$D = TV_s \qquad (12)$$

where $V_s$ is the velocity of the acoustical wave, which for rutile is 10.3 Km/sec to give $$D_r = 1.04 \text{ mm}$$

The number of points resolved in the signature by the hologram is $$D_r/\delta = 24.4.$$

If the system optics is caused to magnify the signature by a factor of 10 at the signature image plane there are $$10D_r/\delta = 244$$

resolved points across the signature image. The signature has $$Tf_0 = 157.6 \text{ cycles}$$

total, which is approximately 1.5 resolution points per cycle. This is certainly better than the BT of the ULM given by $$BT = \Delta fT = (550 \text{ MHz}) (101 \text{ ns}) = 55.6$$

It is obvious upon inspecting Equation (10) that if it is desirable to decrease $D_h$ or $\delta$, then it will be necessary to decrease $l$. In the direct recording scheme, $l$ is limited by the coherence length of the source. The only way to decrease $l$ is to go to a different recording scheme.

Figure 5:
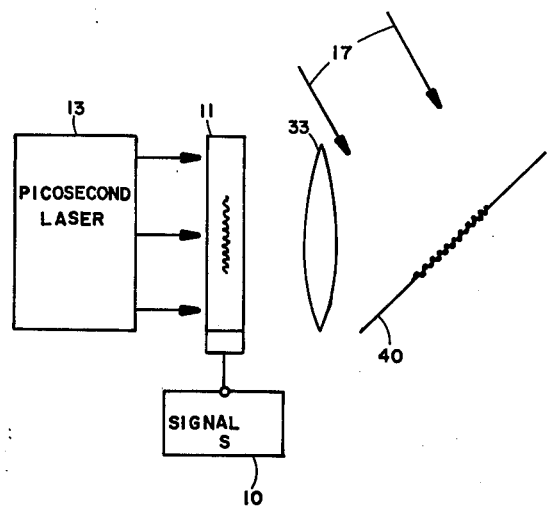
FIG. 5 is a schematic diagram of interim recording.

The interim recording scheme, illustrated in FIG. 5, is to make a temporary holographic recording 40 of a single signature S. Processing the hologram in place and reconstructing the signature wavefront with a longer coherence length laser will allow $l$ (and thus $d$) to be reduced. This will increase the number of resolved points in the signature image for a given $D_h$ or allow $D_h$ to be reduced, thus increasing the number of signatures which may be stored and parallel processed.

As an example assume that $l = 12.7$ cm, which gives $d = 14.8$ cm from Equation (11), $\lambda_r = 0.5145$ λm and $D_h = 4$ mm, then $$\delta = 23.2 \text{ μm}$$

from Equation (10).

Using a rutile ULM and magnifying the signature image by a factor of 10 gives $$10 \, D_r/\delta = 448$$

resolved points. Given this geometry and a 5 inch square hologram plane, the holographic library can record the signature with the equivalent of greater than 450 bits per signature. Calculations based upon the diffraction limit of the circular hologram apertures shows that more than 1000 signatures may be stored and parallel processed and that multiple exposure techniques of superimposing holograms could increase this number to in excess of 3000 signatures. By going to a rectangular hologram aperture, it is possible to increase the calculated number of signatures in the hologram plane by a factor of 400.

If the area of the hologram S is assumed to be 5.1 cm², a Nd:YAG laser with 18 mj of energy per pulse will offer an exposure of $$E_s = 16 \text{ μj/cm}^2$$

using a sapphire ULM and an exposure of $$E_r = 186 \text{ μj/cm}^2$$

using a rutile ULM. The ruby with 50 mj will give $E_s = 35$ μj/cm² and $$E_r = 396 \text{ μj/cm}^2$$

Photographic emulsions are readily available which require of the order of 2 μj/cm² for an exposure. The interim recording scheme allows longer exposure times and highly coherent laser sources to be used to construct the signature library. This improves the quality of the holographic recordings and allows the system to realize the maximum number of holograms in the library.

Figure 6:
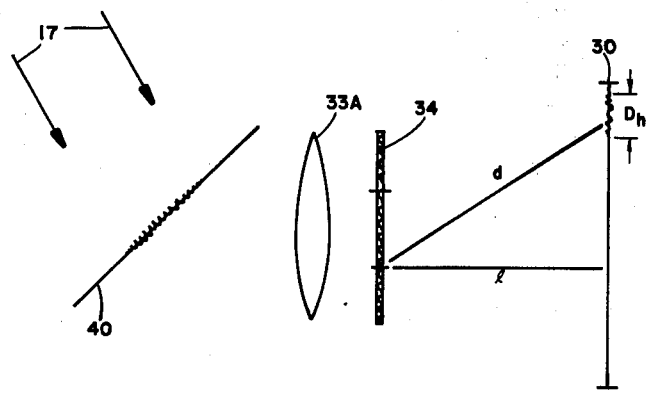
FIG. 6 is a schematic diagram of recording library hologram.
Figure 7:
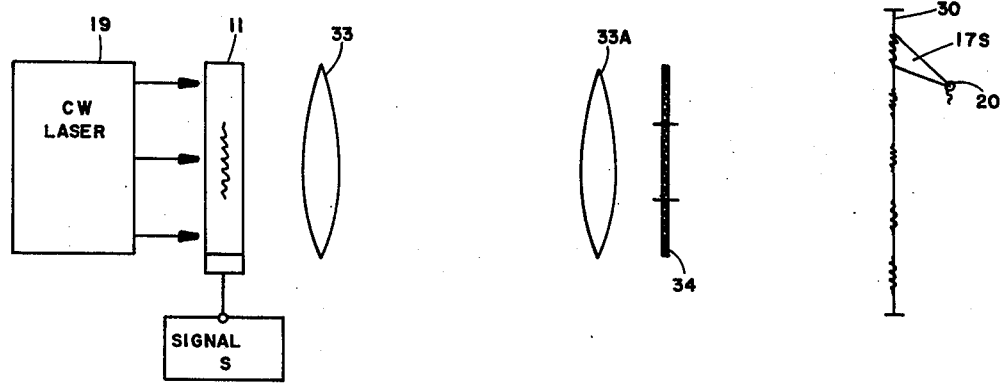
FIG. 7 is a schematic diagram of signature identification.

After the signature is recorded on the interim hologram 40, the signature may be placed at some particular location in the library using the scheme illustrated in FIG. 6. After the library is complete, the interim hologram 40 may be removed (see FIG. 7) and the ULM 11 illuminated by a CW laser source 19 for target identification of signature S where the reconstructed wavefront 17 S trips photodetector 20.

Obviously many modifications and variations of the present invention are possible in the light of the above teachings. It is therefore to be understood that within the scope of the appended claims the invention may be practiced otherwise than as specifically described.

What is claimed is:

1. A holographic signal processor comprising:
   an optical wavefront modulator for receiving a transient signature to be processed;
   a continuous wave coherent source for illuminating said optical wavefront modulator to produce a modulated optical wavefront representative of said transient signature;
   a holographic signature library for receiving said wavefront and having prerecorded thereon a plurality of signatures, each of said signatures being recorded in a discrete location;
   a diffuser interposed between said modulator and said signature library whereby each recorded signature will be illuminated by portions of the optical wavefront representative of the entire signature being processed;
   means for reconstructing the original reference wave when the signature being processed corresponds to a recorded signature; and means to detect and identify the reconstructed reference wave as a recorded signature.

2. The processor of claim 1 wherein said coherent optical wavefront source is a picosecond laser system.

3. The processor of claim 2 wherein said optical wavefront modulator is a transducer driven ultrasonic light modulator.

4. The processor of claim 2 wherein said optical wavefront modulator is a light valve.

5. A method for holographic storage and correlation comprising;
    storing a library of signatures on the same hologram plane, wherein the method for storing each signature comprises:
        positioning a reference wavefront to converge to a focal point behind a photosensitive media hologram plane;
        illuminating each signature with a coherent optical wavefront source to produce a signature wavefront;
        diffusing each signature wavefront to illuminate the entire hologram plane and to interfere with said reference wavefront at said hologram plane; and,
        recording each interference pattern on the photosensitive media at a discrete location;
    processing said photosensitive media after recording the library of signatures;
    placing said developed library hologram at its original position with respect to the signature wavefront;
    removing said reference wavefront;
    passing at least one signature across a signature aperture;
    continuously illuminating the signature aperture by a continuous wave coherent source to produce a signature wavefront;
    diffusing the signature wavefront to address and illuminate the entire library hologram simultaneously;
    reconstructing the original reference wave when a signature which has been recorded appears within the aperture; and,
    detecting the reconstructed reference wave, thereby identifying the signature being illuminated as a recorded signature.

6. The method of claim 5 wherein prior to illuminating a signature with a coherent optical wavefront source, there is the step of propagating a transient electrical signal in an optical wavefront modulator thereby producing an optical signature.

7. The method of claim 5 wherein prior to illuminating a signature with a coherent optical wavefront source, there is the step of propagating a transient electrical signal with a bandwidth on the order of 500 MHz in an optical wavefront modulator thereby producing an optical signature, and wherein said illuminating is with a subnanosecond laser pulse whereby said signature is frozen in position such that the modulated signature wavefront is caused to diffusely illuminate said hologram plane and to interfere at said hologram plane with said reference wavefront.

* * * * *